United States Patent Office 3,469,771
Patented Sept. 30, 1969

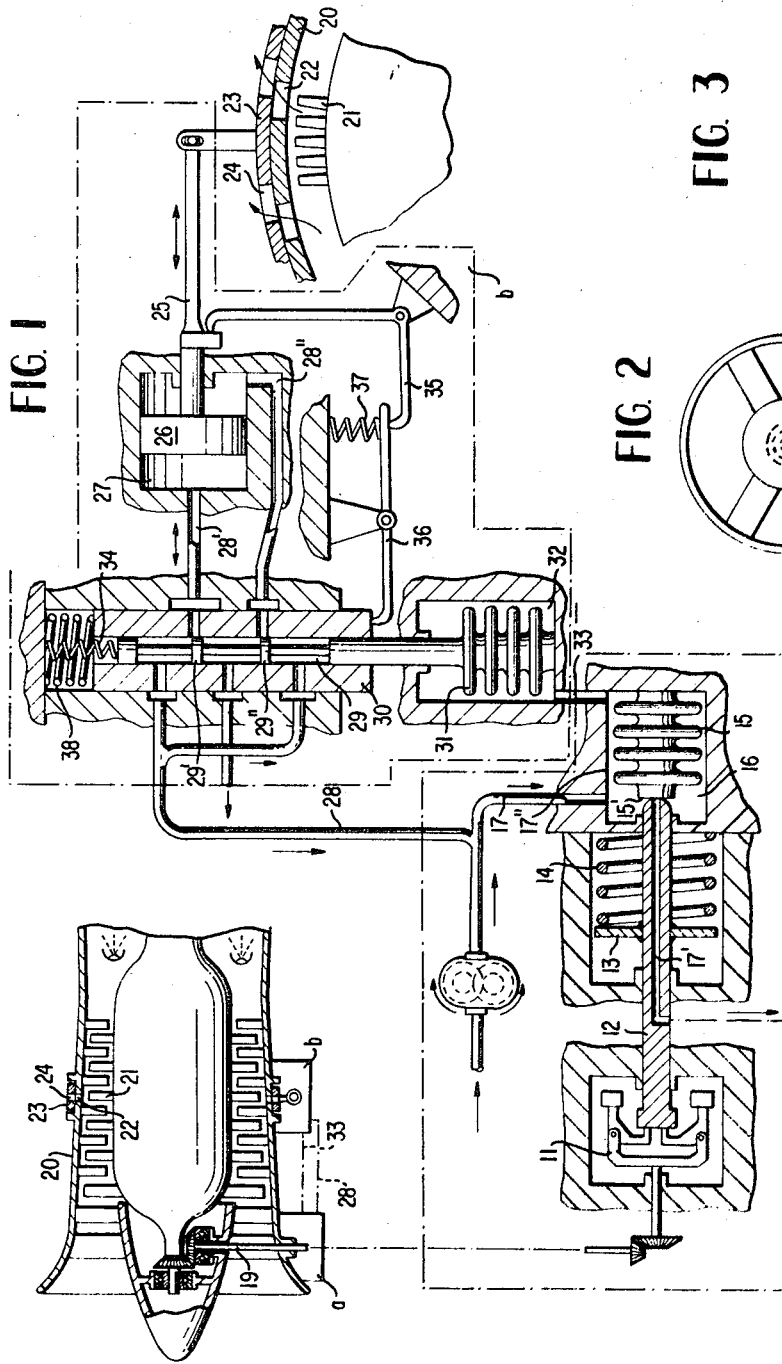
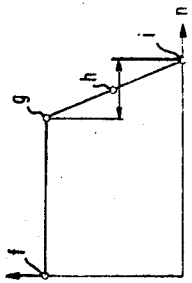
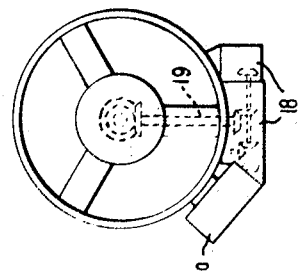
INVENTOR
WILHELM JURISCH

3,469,771
INSTALLATION FOR CONVERTING MECHANICAL CONTROL MOVEMENTS INTO HYDRAULIC CONTROL PRESSURES
Wilhelm Jurisch, Nellingen-Parksiedlung, Germany, assignor to Daimler-Benz Aktiengesellschaft, Stuttgart-Unterturkheim, Germany
Filed Oct. 20, 1967, Ser. No. 676,915
Int. Cl. F04d 27/00; G01l 7/00
U.S. Cl. 230—114                                       13 Claims

ABSTRACT OF THE DISCLOSURE

An installation for converting mechanical control movements into hydraulic control pressures, particularly for controlling the bleeder or relief apertures provided in the compressor housing of a gas-turbine drive unit, which comprises a device producing a control magnitude proportional to the rotational speed of the compressor which, in turn, produces a hydraulic control pressure in dependence on the control magnitude, a servo-system for actuating an annular slide valve operable to open and close the bleeder or relief apertures in such a manner that with a lower rotational speed of the compressor, the apertures are completely opened and with a higher rotational speed, the apertures are closed, and a control system for continuously adjusting the annular slide valve from the open to the closed position in dependence on the control pressure which is transmitted from a transmitter chamber to a receiver chamber, whereby the receiver chamber is provided with a pressure box actuating the piston slide valve member of a control valve unit valving the supply of a pressure medium to the one or other side of the actuating piston of the servo-mechanism while a follower-up mechanism re-adjusts the closure piston surrounding the piston slide valve member of the control valve unit.

BACKGROUND OF THE INVENTION

The present invention relates to an installation for converting mechanical control movements into hydraulic control pressures, having a transmitting chamber which is operatively connected with a pressure circulatory system kept under hydraulic pre-stress, and which includes a pressure box kept under pre-stress by the control magnitude which produces a hydraulic control pressure by the interaction on a discharge valve in dependence on the control magnitude, as described in my prior U.S. Patent 3,115,780.

The purpose of the present invention is, based on the installation of the aforementioned patent, to create a control mechanism of the bleeder or relief installation in compressors of gas turbine drive units which is satisfactory from an operational point of view as well as also with respect to its construction and arrangement.

Installations for controlling the bleeder or relief mechanisms for the purpose of avoiding pumping of the compressor are known in the prior art in various types of constructions. The bleeder or relief mechanism of the prior art consists in general of bleeder or relief apertures disposed at the circumference of the compressor housing which are controlled by an annular slide valve member in such a manner that with a non-rotating compressor or in the lower rotational speed range thereof they are opened fully toward the outside; then, with an increasing rotational speed, they are continuously and progressively closed and upon achieving a higher compression condition they are completely closed off whereby the bleeder slide valve member is actuated by an adjusting piston whose cylinder is connected in a working medium circulatory system (pressure oil circulation) which is controlled by a mechanism which, on the one hand, with a rotational speed change of the compressor opens the working medium circulatory system in dependence on the magnitude of a prevailing condition of the compressor and which, on the other hand, upon reaching the new opening degree of the bleeder slide valve member, again closes the working medium circulatory system by the adjusting movements of the bleeder slide valve member, as described, for example, in U.S. Patent 1,111,498. The transmission of the adjusting movement between the speed governor driven by the compressor shaft and the closing mechanism for the bleeder or relief apertures takes place mechanically in a complicated manner by way of a linkage. With gas-turbine drive units, this type of transmission of the adjusting movement entails problems because it is only possible to provide the apparatus drive at the forward or rearward end of the drive unit so that the bridging of the distance to the closure mechanism disposed at the outer circumference of the compressor housing is connected with constructional difficulties.

Furthermore, bleeder or relief installations for the compressor of gas-turbine drive units are known in the prior art in which the working medium circulatory system is controlled by a mechanism in dependence on the instantaneous pressure difference between two mutually spaced compressor stages, which brings about that the working medium engages either on the one or the other side of the actuating piston for the bleeder control member in order to move the same in the direction of the opening or closing position. The working medium circulatory system of such prior art installation is controlled by a valve unit which is actuated by way of a linkage from an elastic pressure medium that is under the influence of the pressure of a higher compressor stage. On the other hand, also the movements of the actuating piston are transmitted by way of the aforementioned lever linkage to the control piston of the control installation, and more particularly in the sense that the working medium supply to the driving or actuating piston comes to a standstill after a predetermined adjusting path of the bleeder control member whereby any desired intermediate positions of the bleeder control member can be achieved and maintained. Furthermore, a connecting linkage is pivotally connected at the aforementioned lever linkage between the actuating piston and the control piston, on which engage the adjusting movements of a second pressure box which is under the influence of the pressure of a forward or upstream compressor stage. During the operation, the lever ratio changes within the connecting linkage under the influence of the pressure box connected forwardly at the compressor so that the position of the bleeder slide valve member is finally also regulated in dependence on the flight altitude. The control of the bleeder apertures in dependence on the prevailing pressure ratio of the compressor by way of pressure boxes is generally disadvantageous because of the pronounced hysteresis appearances occurring during the increase and during the decrease of the rotational speed of the compressor.

SUMMARY OF THE INVENTION

Compared to the known constructions of the prior art, the present invention is characterized by the use of the mechanism according to my prior U.S. Patent 3,115,780 with a conventional bleeder or relief installation at compressors of gas turbine drive units, having apertures arranged at the circumference of the compressor housing which are adapted to be continuously controlled, for example, by a surrounding annular slide valve member by means of a hydraulic servo-apparatus from the open position at low rotational speeds to the closed position at high rotational speeds from a speed-regulating device driven by the compressor and producing the control magnitude, whereby the transmitter chamber is connected by way of a line, for the purpose of transmitting the produced control pressure, with a receiver chamber which also contains a pressure box that acts on the servo-adjusting apparatus provided with follow-up means.

In consideration of the construction of a gas turbine drive unit and with a view toward a favorable arrangement of the over-all installation, it is further proposed according to the present invention to mount the installation producing the control pressures together with other auxiliary apparatus of the drive unit at the forward end thereof and to mount the servo-adjusting apparatus with the receiver chamber at the compressor housing within the area of the annular slide valve member.

An exact, rotational-speed-responsive control of the respective position of the bleeder or relief slide valve member is achieved by the present invention. Additionally, the over-all construction of the installation permits that those installations and mechanisms which are directly driven in a speed-responsive manner—this is the centrifugal force regulator together with the pressure box mechanically actuated thereby for producing the control pressure—may be arranged at the drive unit remote from the servo-adjusting apparatus located within the area of the bleeder slide valve member, i.e., the installations producing the control pressure, on the one hand, and the installation actuating the bleeder slide valve member as well as those controlling the working medium circulatory system, on the other, may be arranged independently of one another within the areas most appropriate therefor; namely, the control pressure produced within the area of the auxiliary aggregate drive of the drive unit and the other groups of installations within the area of the bleeder or relief apertures externally at the compressor housing; the connection of the two groups of installations takes place by the control pressure line which can be located at the drive unit in a simple and in any appropriate manner.

Accordingly, it is an object of the present invention to provide an installation for converting mechanical control movements into hydraulic control pressures which is simple in construction and reliable in operation yet avoids the aforementioned shortcomings and drawbacks encountered in the prior art.

Another object of the present invention resides in a control mechanism for controlling the bleeder or relief apertures in the compressor housing of gas turbine drive units which permit an arrangement favorable from a structural and spatial point of view.

A further object of the present invention resides in a control installation of the type described above which avoids complicated mechanical linkages as well as difficulties in the transmission of the adjusting movements.

Still a further object of the present invention resides in a control installation for the control of the valve structure valving the bleed apertures in the compressor housing of a gas turbine drive unit which permits a purposeful arrangement and location of the various parts of the control installation to provide a simple and operationally reliable arrangement.

Another object of the present invention resides in a control installation of the type described above which is independent of the hysteresis appearances that occur during increases and decreases of the rotational speed of the compressor.

Still another object of the present invention resides in a control installation of the type described above which permits a favorable arrangement of the over-all installation, taking into due consideration the construction of the drive unit.

These and further objects, features, and advantages of the present invention will become more obvious from the following description when taken in connection with the accompanying drawing which shows, for purposes of illustration only, one embodiment in accordance with the present invention, and wherein:

FIGURE 1 is a cross-sectional view through the compressor section of a gas-turbine drive unit together with a somewhat schematic illustration of the entire bleeder or relief installation according to the present invention;

FIGURE 2 is a front elevational view of the drive unit provided with a control installation of the present invention; and FIGURE 3 is a diagram indicating the control of the bleeder installation according to the present invention.

Referring now to the drawing wherein like reference numerals are used throughout the various views to designate corresponding parts and more particularly to FIGURES 1 and 2, the control pressure producer $a$ which is arranged within the area of the auxiliary aggregates or units 18 (FIG. 2) of the drive unit, consists of a centrifugal governor 11, of a pressure or push rod 12 provided with a spring disk 13, of a coil spring 14 engaging at the spring disk 13 and of a pressure box 15 which is installed in a pressure chamber 16, to be referred to hereinafter as transmitter chamber 16. The transmitter chamber 16 is connected by way of a throttle 17" with a pressure medium circulatory system 17 which is produced by a supply pump driven by the drive unit. The centrifugal governor 11 is driven by the auxiliary aggregate drive 19.

The bleeder or relief apertures 22 disposed in the wall of the housing 20 of the compressor 21 are controlled by an annular slide valve 23 within which are provided bleeder or relief windows 24 and which is connected with an adjusting piston 26 by way of a linkage 25. The adjusting piston 26 slides within a cylinder 27 which is connected with a working medium circulatory system 28 (supply line), 28' and 28"; the working medium circulatory system is controlled by a piston unit 29 having control pistons 29' and 29" and a closure slide valve member 30. The control valve unit 29 is actuated by a pressure box 31, to be referred to hereinafter as control pressure box which is installed into a pressure chamber 32, to be referred to hereinafter as receiver chamber 32 which is in communication by way of a line 33, to be referred to hereinafter as control pressure line, with the transmitter chamber 16. A compression spring 34 retains the valve unit 29 at all times in contact with the pressure box 31. The adjusting piston 26 or the linkage 25 is drivingly coupled or operatively connected with the closure slide valve member 30 by way of a bell-crank 35 and of a further double-armed lever 36 which is under the pre-stress of a relatively strong compression spring 37 whereas the closure slide valve 30 is kept against the lever 36 by a relatively weak compression spring 38. The installations actuating the bleeder slide valve member 23 and controlling the working medium circulatory system 28 are all provided within the area of the bleeder apertures 22 and are combined within an adjusting apparatus $b$.

OPERATION

The operation of the entire installation is as follows:

With a non-rotating compressor and in the low rotational speed range of the compressor, the adjusting piston 26 is in the left end position thereof so that the bleeder or relief apertures 22 and the bleeder or relief windows 24 are in alignment one above the other. This condition corresponds to the operating range $f$–$g$ in the diagram of FIGURE 3. The rotating flyweights of the centrifugal governor 11, by way of the push-rod 12, place the pressure box 15 under a pre-stress which is proportional to the rotational speed of the compressor. The push-rod 12 thereby abuts initially against the end face 15' of the pressure box 15 so that the return line 17' is still closed. The respective position of the push-rod 12, conditioned by the rotational speed of the centrifugal governor 11, is kept by the counter-force of the spring 14. As a result of the increasing rotational speed of the pump, a pressure builds up in the pressure medium circulatory system 17 and therewith also in the transmitter chamber 16 which compresses the pressure box 15 independently of the position of the rod 12. As soon as this pressure, which during the acceleration of the drive unit slightly trails the pre-stress condition by the position of the rod 12, reaches the magnitude of the latter or exceeds the same within small limits, the box 15 is compressed still somewhat more than takes place as a result of the action of the push-rod 12 by the centrifugal governor 11 so that the surface 15' is lifted off slightly from the push rod 12 and the return line 17' leading away from the end face of the push rod 12 is freed thereby, whence pressure medium (pressure oil) is able to flow back to the tank 39. The pressure in the transmitter chamber 16 which thus corresponds to the respective rotational speed, now no longer increases and is transmitted as control pressure by way of the control pressure line 33 to the control chamber 32 and influences thereat the pressure box 31, i.e., compresses the same. At the operating point g (FIG. 3), the control piston unit 29 starts to shift the working medium circulatory system 28, 28', 28''; the control piston 29 now opens up the pressure medium supply by way of the line section 28' whereas the control piston 29'' closes the pressure medium supply to the line section 28''. The adjusting piston 26 now moves a distance toward the right and comes to a standstill in the illustrated position corresponding to the rotational speed of the compressor, since in the meantime the closure slide valve member 30 has been adjusted by the movement of the adjusting piston 26 by way of the levers 35 and 36 and has closed again the working medium circulatory system (operating points h in diagram of FIGURE 3). If the rotational speed of the compressor increases above the operating point indicated in FIGURE 3 at i, then the bleeder apertures 22 are completely closed by the annular slide valve member 23, i.e., a higher pressure condition of the compressor is achieved thereby.

As a result of the over-all installation described hereinabove, the bleeder slide valve 23 is able to assume and maintain directly dependent from the prevailing compressor rotational speed, the open position, the completely closed position and any intermediate position (in the operating range g–h–i).

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. An installation for converting mechanical control movements into hydraulic control pressures, including a transmitter chamber operatively connected to a pressure medium circulatory system normally kept under hydraulic pre-stress, which contains a pressure box kept under pre-stress by a control magnitude, whereby the pressure box produces a hydraulic control pressure by the operative engagement therewith of a discharge valve dependent upon the control magnitude, wherein the improvement comprises, in a gas-turbine drive unit having compressor means with a compressor housing, a bleeder installation at the compressor means provided with aperture means arranged at the circumference of the compressor housing, valve means associated with said aperture means, and control means operatively connected with said valve means for continuously controlling said valve means from an open position at relatively low rotational speed to a closed position at relatively high rotational speeds, comprising actuating means including hydraulic servo-means for said valve means and speed-responsive regulator means driven by said compressor means and producing said control magnitude, the transmitter chamber being operatively connected, by way of a control line, with an auxiliary chamber containing pressure box means, said pressure box means being operatively connected with said actuating means, wherein said servo-means includes follow-up means.

2. An installation according to claim 1, wherein said valve means is an annular slide valve surrounding the compressor housing.

3. An installation according to claim 1, wherein at least the equipment producing the control pressure is arranged at the forward end of the drive unit and the servo-means of the actuating means is arranged at the compressor housing within the area of the valve means.

4. An installation according to claim 3, further comprising a push rod between the speed-responsive regulator means and the pressure box means, said pressure medium circulatory system including a discharge line controlled by the discharge valve, said discharge line extending at least through a portion of said push rod.

5. An installation according to claim 4, wherein said control means includes a control slide valve unit having closure valve means, a double-armed lever, said closure valve means being kept against one arm of said double-armed lever by the pre-stress of a spring, the other arm of said double-armed lever being operatively connected with one of the two parts consisting of the adjusting piston of the servo-means and the valve means.

6. An installation according to claim 5, wherein said other arm is directly connected with said one part.

7. An installation according to claim 5, wherein said other arm is connected with said one part by way of a bell crank.

8. An installation according to claim 5, wherein the hydraulic medium of the circulatory system kept under pressure is supplied to the transmitter chamber by way of a throttling means.

9. An installation for converting mechanical control movements into hydraulic control pressures, including a transmitter chamber operatively connected to a pressure medium circulatory system normally kept under hydraulic pre-stress, which contains a pressure box kept under pre-stress by a control magnitude, whereby the pressure box produces a hydraulic control pressure by the operative engagement therewith of a discharge valve dependent upon the control magnitude, wherein the improvement comprises, in a gas-turbine drive unit having compressor means with a compressor housing, a bleeder installation at the compressor means provided with aperture means arranged at the circumference of the compressor housing, valve means associated with said aperture means, and control means operatively connected with said valve means for continuously controlling said valve means from an open position at relatively low rotational speed to a closed position at relatively high rotational speeds, comprising actuating means including hydraulic servo-means for said valve means and speed-responsive regulator means driven by said compressor means and producing said control magnitude, the transmitter chamber being operatively connected, by way of a control line, with an auxiliary chamber containing pressure box means, said pressure box means being operatively connected with said actuating means, further comprising a push rod between the speed-responsive regulator means and the pressure box means, said pressure medium circulatory system including a discharge line controlled by the discharge valve, said discharge line extending at least through a portion of said push rod.

10. An installation for converting mechanical control movements into hydraulic control pressures, including a transmitter chamber operatively connected to a pressure medium circulatory system normally kept under hydraulic pre-stress, which contains a pressure box kept under pre-stress by a control magnitude, whereby the pressure box produces a hydraulic control pressure by the operative engagement therewith of a discharge valve dependent upon the control magnitude, wherein the improvement comprises, in a gas-turbine drive unit having compressor means with a compressor housing, a bleeder installation at the compressor means provided with aperture means arranged at the circumference of the compressor housing, valve means associated with said aperture means, and control means operatively connected with said valve means for continuously controlling said valve means from an open position at relatively low rotational speed to a closed position at relatively high rotational speeds, comprising actuating means including hydraulic servo-means for said valve means and speed-responsive regulator means driven by said compressor means and producing said control magnitude, the transmitter chamber being operatively connected, by way of a control line, with an auxiliary chamber containing pressure box means, said pressure box means being operatively connected with said actuating means, wherein said control means includes a control slide valve unit having closure valve means, a double-armed lever, said closure valve means being kept against one arm of said double-armed lever by the prestress of a spring, the other arm of said double-armed lever being operatively connected with the valve means.

11. An installation according to claim 10, wherein the other arm is directly connected with said one part.

12. An installation according to claim 10, wherein the other arm is connected with said one part by way of a bell crank.

13. An installation according to claim 1, wherein the hydraulic medium of the circulatory system kept under pressure is supplied to the transmitter chamber by way of a throttling means.

References Cited

UNITED STATES PATENTS

| 2,741,423 | 4/1956 | Lombard. |
| 3,006,145 | 10/1961 | Sobey. |
| 3,166,989 | 1/1965 | Cowles et al. |

FOREIGN PATENTS

| 869,576 | 5/1961 | Great Britain. |

HENRY F. RADUAZO, Primary Examiner

U.S. Cl. X.R.

73—388